US00RE48511E

(19) United States
(12) Reissued Patent
Thompson et al.

(10) Patent Number: US RE48,511 E
(45) Date of Reissued Patent: Apr. 13, 2021

(54) GARMENT HAVING INTEGRATED PERSPIRATION BARRIERS

(71) Applicant: 3 Pak Holdings, LLC, Placentia, CA (US)

(72) Inventors: William Thompson, Placentia, CA (US); Randy Hyun Choi, Anaheim, CA (US)

(73) Assignee: 3 Pak Holdings, LLC, Las Vegas, NV (US)

(21) Appl. No.: 15/692,851

(22) Filed: Aug. 31, 2017

Related U.S. Patent Documents

Reissue of:
(64) Patent No.: 8,898,812
Issued: Dec. 2, 2014
Appl. No.: 13/282,148
Filed: Oct. 26, 2011

U.S. Applications:
(60) Provisional application No. 61/436,841, filed on Jan. 27, 2011.

(51) Int. Cl.
*A41D 27/12* (2006.01)
*A41D 27/13* (2006.01)

(52) U.S. Cl.
CPC ..... *A41D 27/13* (2013.01)

(58) Field of Classification Search
CPC ..... A41D 27/13; A41D 27/02; A41D 27/12
See application file for complete search history.

(56) References Cited

U.S. PATENT DOCUMENTS 887,454 A 10/1907 Basch
2,005,232 A * 6/1935 Marsh ..... 2/53
(Continued)

FOREIGN PATENT DOCUMENTS

JP 2009114582 A * 5/2009
WO 2004089614 10/2004

OTHER PUBLICATIONS

Perumalraj, R., Waterproof Breathable Fabric (Year: 2006).*
(Continued)

*Primary Examiner* — Patricia L Engle
(74) *Attorney, Agent, or Firm* — Stetina Brunda Garred and Brucker; Mark B. Garred

(57) ABSTRACT

In accordance with the present invention, there is provided a garment or undergarment (e.g., a T-shirt) which is provided with integrated multi-layer perspiration barriers uniquely configured to provide high levels of evaporative cooling and moisture vapor transmission. The perspiration barriers are integrated into the sleeve and torso portions of the garment such that such perspiration barriers actually define the underarm portions thereof. Each of the perspiration barriers is preferably comprised of four layers, each of which is formed from two separate panel pieces. The various layers included in each of the perspiration barriers, the manner in which such layers are stacked upon and attached to each other, and the manner in which the layers forming each perspiration barrier are integrated into the garment are specifically adapted to collectively promote evaporative cooling and a vapor transmission effect which provides superior perspiration absorption and evaporation, in addition to enhanced user comfort.

22 Claims, 2 Drawing Sheets

(56) References Cited

U.S. PATENT DOCUMENTS

| | | | | | |
|---|---|---|---|---|---|
| 2,177,543 | A * | 10/1939 | Vecchi | A41B 9/06 | 2/46 |
| 2,438,771 | A * | 3/1948 | Topjian | 2/53 | |
| 3,474,465 | A * | 10/1969 | Artzt | A41D 27/13 | 2/113 |
| 3,508,279 | A * | 4/1970 | Ayoub | A41D 27/10 | 2/113 |
| 3,588,916 | A * | 6/1971 | Glatt | 2/53 | |
| 3,885,247 | A | 5/1975 | Kost | | |
| 4,393,521 | A * | 7/1983 | Jones | 2/56 | |
| 4,603,440 | A * | 8/1986 | Hale | 2/115 | |
| 4,805,240 | A | 2/1989 | Siqveland | | |
| 5,042,088 | A | 8/1991 | Sherrod et al. | | |
| 5,778,457 | A * | 7/1998 | Conway | 2/406 | |
| 6,138,276 | A | 10/2000 | Asciutto | | |
| 6,145,129 | A | 11/2000 | Czekalla | | |
| 6,282,720 | B1 | 9/2001 | Mayer | | |
| 6,347,407 | B1 * | 2/2002 | Dowell | A41B 9/06 | 2/113 |
| 6,591,425 | B1 * | 7/2003 | Zellers | 2/54 | |
| 7,111,568 | B1 | 9/2006 | Sakuma | | |
| 2006/0085885 | A1 | 4/2006 | Williams | | |
| 2006/0150294 | A1 * | 7/2006 | Yanamadala | 2/53 | |
| 2006/0168704 | A1 * | 8/2006 | Mayer et al. | 2/54 | |
| 2006/0288463 | A1 * | 12/2006 | Bernard et al. | 2/46 | |
| 2008/0052802 | A1 | 3/2008 | Bryan | | |
| 2008/0086791 | A1 | 4/2008 | Samuel | | |
| 2008/0096001 | A1 | 4/2008 | Van Emden et al. | | |
| 2009/0183292 | A1 * | 7/2009 | Price | 2/54 | |

OTHER PUBLICATIONS

Wikipedia explanation of Terry cloth (Year: 2019).*

International Search Report and Written Opinion for PCT/US2012/021689, dated Apr. 24, 2012.

Petition for Inter Parties Review of U.S. Pat. No. 8,898,812 filed on Jun. 6, 2017; Case IPR 2017-01529.

IPR Exhibit No. 1007: David Brookstein, Sc.D.; Curriculum Vitae; Engineering and Litigation Consultant in Fields of Textiles, GarmentSystems, Fibers, Fabrics and Composites.

IPR Petitioner's Exhibit No. 1006: Declaration of Dr. David Brookstein; Jun. 1, 2017.

Supplemental Declaration of Dr. David Brookstein; Aug. 24, 2017.

International Search Report and Written Opinion for PCT/US2012/021689. Apr. 24, 2012.

* cited by examiner

GARMENT HAVING INTEGRATED PERSPIRATION BARRIERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application *is a reissue of U.S. application Ser. No. 13/282,148, filed Oct. 26, 2011, which* claims priority to U.S. Provisional Patent Application Ser. No. 61/436,841 entitled GARMENT HAVING INTEGRATED PERSPIRATION BARRIERS filed Jan. 27, 2011, the [disclosure] *disclosures* of which [is] *are* incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to wearing apparel and, more particularly, to a garment or undergarment (e.g., a T-shirt) which is provided with integrated multi-layer perspiration barriers uniquely configured to provide high levels of evaporative cooling and moisture vapor transmission.

2. Description of the Related Art

As is known in the medical field, hyperhidrosis is a condition characterized by abnormally increased perspiration, in excess of that required for the regulation of body temperature. Hyperhidrosis can either be generalized or localized to specific parts of the body. Hands, feet, armpits and the groin area are among the most active regions of perspiration due to the relatively high concentration of sweat glands.

Of the various manifestations of hyperhidrosis, one of the most problematic for many individuals is axillary hyperhidrosis, or excessive underarm sweating. Because of the various stigmas that society has perpetuated about people who sweat excessively, as well as the unsightly appearance of excessive underarm perspiration, sufferers of axillary hyperhidrosis are often reluctant to wear certain fabrics or colors which exacerbate the appearance of the perspiration. In addition, these sufferers are often compelled to leave jackets, sweaters, sport coats or other garments on to their discomfort, solely for the shielding effect provided by these outer garments. Moreover, in extreme circumstances, sufferers may resort to actually bringing changes of clothes with them to work or other events, assuming that the level of perspiration in a worn garment will reach a level of severity which mandates a disruptive, yet necessary change of clothes.

For the treatment of axillary hyperhidrosis, the aluminum chloride used in regular antiperspirants is typically insufficient, with sufferers often needing solutions with higher concentrations to effectively treat the symptoms of the condition. However, one of the major side effects of antiperspirant solutions which are adaptive to facilitate the treatment of axillary hyperhidrosis is a high level of irritation to the skin. Though surgical options are available for the treatment of axillary hyperhidrosis, including sweat gland removal or destruction, many sufferers seek treatment options which do not require a surgical procedure due to the cost of the procedure, the risks associated therewith, or other factors.

In recognition of the social difficulties experienced by many axillary hyperhidrosis sufferers and the reluctance of many of these sufferers to seek medical or surgical intervention for the treatment of their condition, there has been developed in the prior art various undergarments with permanently attached perspiration shielding which are adapted to protect outer clothing for underarm perspiration. Such undergarments are described, for example, in U.S. Pat. No. 6,591,425 to Zellers, and in U.S. Patent Publication Nos. 2006/0168704 to Mayer, et al, and 2008/0086791 to Kirkwood Samuels, et al. Though the undergarments described in these and other references provide the general effect of protecting a wearer's outer clothing from underarm perspiration, they possess certain deficiencies which detract from the overall utility. For example, in certain ones of these prior art undergarments, the perspiration shield includes a waterproof layer and is placed proximate the wearer's skin in the underarm area, thus actually causing increased levels of perspiration attributable to the shield acting as a barrier to air flow, in addition to causing discomfort to the wearer. Additionally, in certain ones of these prior art garments, the layered construction of the perspiration shields included therein is not adapted to facilitate cooling air flow via a billowing effect, or to promote wearer comfort.

The present invention addresses and overcomes the deficiencies highlighted above by providing a garment or undergarment (e.g., a T-shirt) which is provided with integrated multi-layer perspiration barriers uniquely configured to provide high levels of evaporative cooling and moisture vapor transmission. These, as well as other features and advantages of the present invention will be described in more detail below.

BRIEF SUMMARY OF THE INVENTION

In accordance with the present invention, there is provided a garment or undergarment (e.g., a T-shirt) which is provided with integrated multi-layer perspiration barriers uniquely configured to provide high levels of evaporative cooling and moisture vapor transmission. More particularly, in the garment construction in accordance with the present invention, the perspiration barriers are integrated into the sleeve and torso portions of the garment such that such perspiration barriers actually define the underarm portions thereof. This is in contrast to prior art garment constructions wherein the perspiration shields are attached to the interior or exterior surfaces of the underarm portions of an existing garment, as opposed to the shield themselves defining such underarm portions.

In addition, each of the perspiration barriers integrated into the garment of the present invention is preferably comprised of four separate layers, each of which has a two-piece or panel construction. The materials of the various layers included in each of the perspiration barriers, the manner in which the layers are stacked upon and attached to each other, and the manner in which the stacked layers of joined panel pieces forming each perspiration barrier are integrated into the garment are specifically adapted to collectively promote evaporative cooling and a vapor transmission effect which provides superior perspiration absorption and evaporation, in addition to enhanced user comfort.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
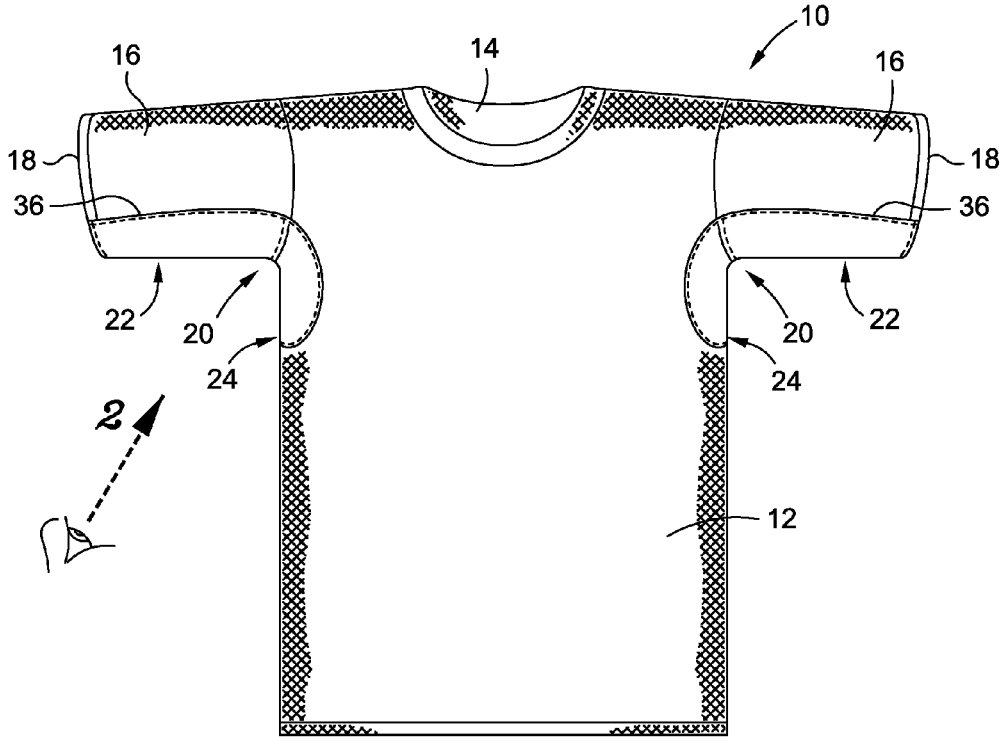
FIG. 1 is a front elevational view of an undergarment constructed in accordance with the present invention.
Figure 2:
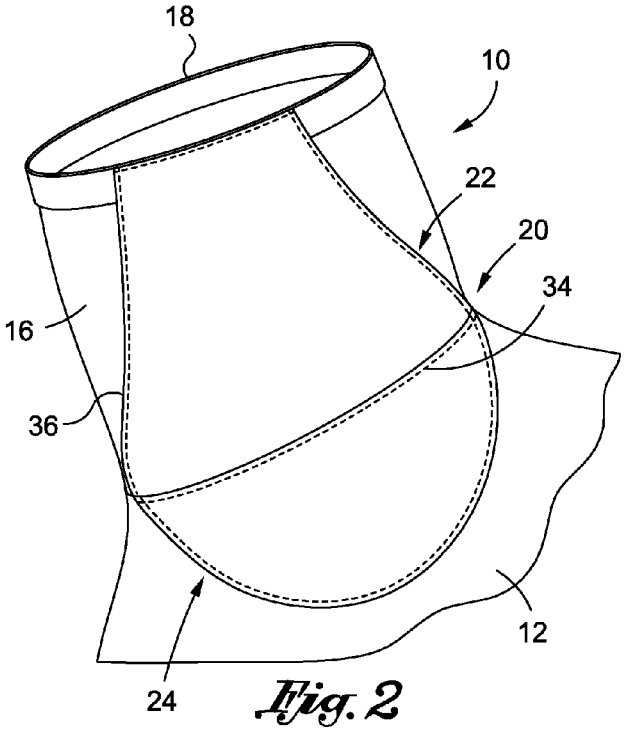
FIG. 2 is a plan view of one of the multi-layer perspiration barriers integrated into the undergarment of the present invention, as viewed from the perspective of the view angle 2 shown in FIG. 1.

Referring now to the drawings wherein the showings are for purposes of illustrating a preferred embodiment of the present invention only, and not for purposes of limiting the same, FIGS. 1 and 2 depict a garment 10 constructed in accordance with the present invention. In an exemplary embodiment, the garment 10 is an undergarment and, more particularly, a T-shirt. In this regard, the garment 10 comprises a torso portion 12, one end of which includes an opening 14 therein to accommodate the head and neck of a wearer. In addition to the torso portion 12, the garment 10 includes an opposed pair of sleeve portions 16 which are attached to the torso portion 12 and are sized to cover the upper arms of the wearer of the garment 10. As further seen in FIGS. 1 and 2, each of the sleeves 16 defines a distal rim or end 18.

Figure 3:
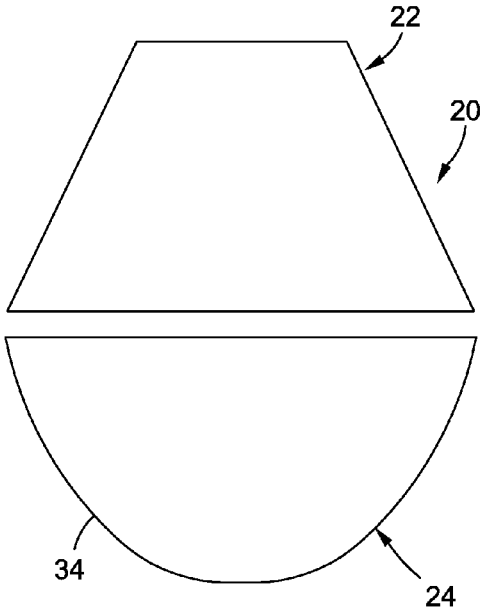
FIG. 3 is a partially exploded view of one of the layers included in each of the multi-layer perspiration barriers integrated into the undergarment of the present invention, depicting the two-piece primary construction thereof.
Figure 4:
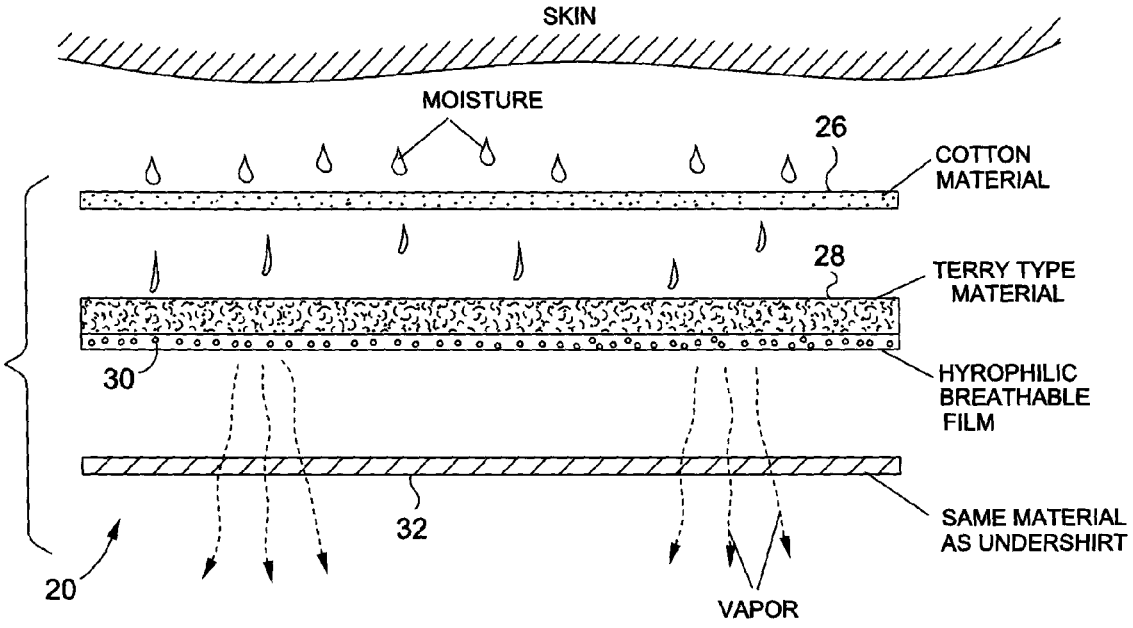
FIG. 4 is an exploded view of one of the multi-layer perspiration barriers integrated into the undergarment of the present invention, depicting the various layers included therein.
Figure 5:
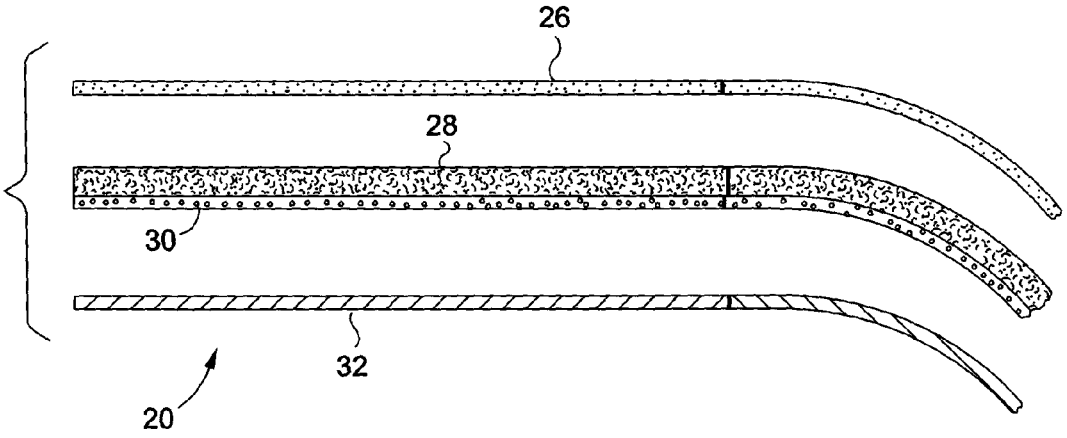
FIG. 5 is a cross sectional view of the multi-layer perspiration barrier, wherein each layer includes a sleeve-panel piece and a torso panel piece joined by a respective stitched seam.

The garment 10 further comprises an identically configured pair of perspiration barriers 20 which are integrated into the remainder of the garment 10 in a manner which will be described in more detail below. As seen in FIG. 4, each of the perspiration barriers 20 preferably comprises a plurality (e.g., four) stacked layers. Additionally, as seen in FIG. 3, each of these layers has a two-piece construction, comprising a sleeve panel piece 22 and a torso panel piece 24 which are preferably sewn to each other as also described in more detail below. As further seen in FIG. 3, the sleeve panel piece 22 of each layer has a generally trapezoidal configuration, with the torso panel piece 24 having a generally semi-circular configuration.

As indicated above, each perspiration barrier 20 is provided with a four-layer construction. More particularly, as seen in FIG. 4, each perspiration barrier comprise a first layer 26 which will normally be in direct contact with the skin in the underarm of the wearer of the garment 10. As such, the first layer 26 is preferably fabricated from 100% cotton to provide an increased level of comfort to the wearer. The use cotton material of the first layer 26 is advantageous due to the ability of odor molecules emanating from the wearer's skin to easily break away from the cotton fibers, thus combating odor issues. Positioned against the first layer 26 is a second layer 28 which, according to one embodiment, is formed from a loosely woven material, preferably a terry-cloth material fabricated from 80%-20% canon/polyester blend. As will also be discussed in more detail below, the "loop" design of the terry-cloth material used for the second layer 28 facilitates better airflow through the fully fabricated perspiration barrier 20, thus enhancing an evaporative cooling effect provided thereby.

In addition to the first and second layers 26, 28, each of the perspiration barriers comprises a third layer 30 which is positioned against the second layer 28 such that the second layer 28 is effectively oriented between the first and third layers 26, 30. The third layer 30 is preferably a hydrophilic breathable film which is fabricated from polyurethane and bonded by a finely dispersed adhesive dot pattern to the second layer 28. Positioned against the third layer 30 is a fourth layer 32, the third layer 30 thus being oriented between the second and fourth layers 28, 32. The fourth layer 32 is preferably made of the same material as the torso and sleeve portions 12, 16 of the garment 10 (e.g., a cotton material) for aesthetic consistency when the perspiration barriers 20 are integrated therein. In this regard, whereas the first layer 26 defines the innermost surface of each perspiration barrier 20 in the completed garment 10 which will directly contact the skin of the wearer thereof, the fourth layer 32 defines the outermost surface of each perspiration barrier 20 in the completed garment 10 which is visually exposed when the same is being worn by the wearer.

As indicated above each of the first, second, third and fourth layers 26, 28, 30, 32 of each of the perspiration barriers 20 comprises a pair of the sleeve and torso panel pieces 22, 24 which are joined (e.g. sewn) to each other. More particularly, in fabricating each of the first and fourth layers 26, 32, a portion of the sleeve panel piece 22 extending along the peripheral base edge segment thereof of greatest length is joined to a portion of the torso panel piece 24 extending along the linear, non-arcuate peripheral edge segment thereof by an elongate stitch 34 which defines a foldable crease between the sleeve and torso panel pieces 22, 24.

However, in fabricating the second and third layers 28, 30, the sleeve panel pieces 22 of such second and third layers 28, 30 are initially bonded to each other in the aforementioned manner, as are the torso panel pieces 24 thereof. Thereafter, the bonded sleeve panel pieces 22 of the second and third layers 28, 30 are sewn to the bonded torso panel pieces 24 thereof by a single, elongate stitch 34. As described above in relation to the first and fourth layers 26, 32, the stitch 34 joining the bonded sleeve panel pieces 22 of the second and third layers 28, 30 to the bonded torso panel pieces 24 thereof extends along the peripheral base edge segments of the bonded sleeve panel pieces 22 of greatest length and the linear, non-arcuate peripheral edge segments of the bonded torso panel pieces 24, such stitch 34 also defining a foldable crease therebetween. Advantageously, the materials from which the second and third layers 28, 30 are fabricated, in concert with the manner in which they are attached to each other, enhances vapor transmission and breathability between the adjacent second and third layers 28, 30 in each of the fully fabricated perspiration barriers 20.

Once the various corresponding pairs of sleeve and torso panel pieces 22, 24 have been sewn to each other in the aforementioned manner, the resultant first, second, third and fourth layers 26, 28, 30, 32 are stacked upon each other such that the first layer 26 is positioned against the second layer 28, and the fourth layer 32 is positioned against the third layer 30. As indicated above, each perspiration barrier 20 of the garment 10 comprises the first, second, third and fourth layers 26, 28, 30, 32 as stacked upon each other in this particular sequence. Once each perspiration barrier 20 has been fabricated or assembled in the aforementioned manner, it is sewn into the torso portion 12 and a corresponding sleeve portion 16 of the garment 10 using a continuous overlock stitch which extends solely along the peripheral edge thereof. It is contemplated that this peripheral overlock stitch will be covered by a continuous cover stitch 36 to provide a more desirable appearance to the garment 10.

Additionally, as best seen in FIG. 2, each perspiration barrier 20 is preferably orientated relative to the remainder of the garment 10 such that the peripheral base edge segments of shortest length within the stacked sleeve panel pieces 22 of each perspiration barrier 20 extend along the distal end 18 of a respective one of the sleeve portions 16. Extending each perspiration barrier 20 to the distal end 18 of a respective one of the sleeve portions 16 helps reduce any occurrences of undesirable dripping of perspiration down the wearer's arm when the garment 10 is being worn. However, those of ordinary skill in the art will recognize that each perspiration barrier 20 may alternatively be orientated within the remainder of the garment 10 such that a gap or space of a prescribed width separates each perspiration barrier 20 from the distal end 18 of a corresponding sleeve portion 16.

Advantageously, the manner in which the perspiration barriers 20 are assembled, and in turn integrated into the remainder of the garment 10, provides enhanced evaporative cooling and moisture vapor transmission attributable to a billowing effect in each of the perspiration barriers 20. This billowing effect, and the resultant evaporative cooling and moisture vapor transmission process, also serves to decrease perspiration by lowering body temperature. Such billowing effect is achieved by the particulars of the construction of each of the perspiration barriers 20, and is enhanced by the minimal amount of stitching which extends through areas other than the peripheral portions thereof (thereby reducing the number of interiorly located needle holes). In this regard, as previously explained, within each perspiration barrier 20, the only stitching that extends through the interior thereof are the three separate, elongate stitches 34 that are used to join the sleeve and torso panel pieces 22, 24 of the first, second, third and fourth layers 26, 28, 30, 32 to each other. These stitches 34 within each perspiration barrier 20 provide the advantage of collectively creating a crease which allows the wearer of the garment 10 to more easily lift and lower his or her arms without undue resistance by the perspiration barriers 20, while further preventing an excessive amount of noise being generated by the arm lifting and lowering process. Moreover, since the stitches 34 within each perspiration barrier 20 are only generally aligned with each other and do not give rise to the creation of continuous needle holes which span through each the first, second, third and fourth layers 26, 28, 30, 32, there is a significantly reduced potential for moisture or perspiration to travel along the stitches 34 and through the needle holes in a manner comprising the integrity of each perspiration barrier 20.

The "perimeter only" stitching used to facilitate the attachment of each of the fully fabricated perspiration barriers 20 to the remainder of the garment 10 allows outside air to be drawn into and between the first and second layers 26, 28, as well as the third and fourth layers 30, 32, of each of the perspiration barriers 20. At the same time, the stitches 34 of each of the perspiration barriers 20, due to thereof relative orientations, do not unduly compromise the billowing effect. As a result, as seen in FIG. 4, moisture produced and emanating from the underarm skin of the wearer is initially transported through the first layer 26, and into a space or air chamber between the first and second layers 26, 28. Such moisture is then channeled through the second layer 28 and is thereafter transported along the molecular chains of the block co-polymer of the third layer 30 to reach equilibrium with the outside atmosphere, which also facilitates the transition of the moisture to a vapor state. As is also shown in FIG. 4, the vapor which emanates from the third layer 30 in turn flows into the space or air chamber between the third and fourth layers 30, 32. As indicated above, the bonding of the third layer 30 to the second layer 28 by the finely disbursed adhesive dot pattern of the third layer 30 allows for better vapor transmission and breathability through such third layer 30. The vapor within the space between the third and fourth layers 30, 32 is thereafter released from the perspiration barrier 20 through the exterior fourth layer 32.

This disclosure provides an exemplary embodiment of the present invention. The scope of the present invention is not limited by this exemplary embodiment. Numerous variations, whether explicitly provided for by the specification or implied by the specification, such as variations in structure, dimension, type of material and manufacturing process may be implemented by one of skill in the art in view of this disclosure. For example, those of ordinary skill in the art will recognize that the above-described perspiration barriers 20 may be integrated into a garment other than for an undergarment such as a T-shirt. Additionally, some or all of the stitching described above could potentially be substituted with a suitable fabric adhesive.

What is claimed is:

1. A garment having an internal surface adapted to contact a wearer's skin and an external surface, the garment comprising:

a torso portion fabricated from a garment material;

a pair of sleeve portions fabricated from the garment material, the sleeve portions being attached to and extending from the torso portion; and a pair of perspiration barriers each of the perspiration barriers comprising:

a first layer fabricated from a cotton material;

a second layer disposed adjacent the first layer and fabricated from a terry cloth material;

a third layer disposed adjacent the second layer and fabricated from a hydrophilic breathable film; and a fourth layer disposed adjacent the third layer and fabricated from the garment material;

the pair of perspiration barriers defining respective barrier peripheral edge regions, each barrier peripheral edge region being coupled to and at least partially circumvented by a corresponding peripheral edge region collectively defined by the torso portion and a respective one of the sleeve portions such that the external surface of an underarm area of the garment is collectively formed by each of the fourth layers of the perspiration barriers and the respective torso and sleeve portions;

wherein at least the first and fourth layers of each of the perspiration barriers is segregated into a sleeve panel piece and a torso panel piece, the sleeve panel piece and torso panel piece of the first layer being joined together by a first stitched seam and the sleeve panel piece and torso panel piece of the fourth layer being joined together by a second stitched seam separate from the first stitched seam.

2. The garment of claim 1 wherein the terry cloth material is fabricated from a blend of about 80% cotton and about 20% polyester.

3. The garment of claim 1 wherein the hydrophilic breathable film is fabricated from polyurethane.

4. The garment of claim 1 wherein the garment material is fabricated from a cotton material.

5. The garment of claim 1 wherein the first layer is fabricated from a 100% cotton material.

6. The garment of claim 1 wherein the second and third layers are joined to each other via an adhesive bond.

7. The garment of claim 6 wherein the first, second, third and fourth layers are joined to each other and to the torso and sleeve portions of the garment via a peripheral overlock stitch.

8. The garment of claim 7 wherein each of the first, second, third and fourth layers of each of the perspiration barriers is segregated into a sleeve panel piece and a torso panel piece, the sleeve panel piece and torso panel piece of each of the first, second, third and fourth layers being joined together by a separately stitched seam to define a foldable crease therebetween.

9. The garment of claim 8 wherein:

the sleeve panel piece of each of the first, second, third and fourth layers has a generally trapezoidal configuration defining a peripheral base segment of greatest length;

the torso panel piece of each of the first, second, third and fourth layers has a generally semi-circular configuration defining a non-arcuate peripheral edge segment; and the crease extends along the base segment of the sleeve panel piece and along the non-arcuate peripheral edge segment of the torso panel piece.

10. The garment of claim 8 wherein each of the sleeve portions defines a distal end and the sleeve panel pieces of each of the perspiration barriers extend to the distal end of a respective one of the sleeve portions.

11. The garment of claim 8 wherein each of the perspiration barriers is attached to the torso portion and a respective one of the sleeve portions via a peripheral overlock stitch.

12. The garment of claim 1 wherein each of the first, second, third and fourth layers of each of the perspiration barriers is segregated into a sleeve panel piece and a torso panel piece, the sleeve panel piece and torso panel piece of each of the first, second, third and fourth layers being joined together by a separately stitched seam to define a foldable crease therebetween.

13. The garment of claim 1 wherein each of the perspiration barriers is attached to the torso portion and a respective one of the sleeve portions via a peripheral overlock stitch.

14. The garment of claim 13 wherein the overlock stitch is covered by a cover stitch.

[15. A garment having an internal surface adapted to contact a wearer's skin and an external surface, the garment, comprising:

a torso portion;

a pair of sleeve portions attached to and extending from the torso portion in opposed relation to each other; and a pair of perspiration barriers, each of the perspiration barriers comprising:

a first layer fabricated from a soft, pliable meat adapted to permit the transmission of moisture therethrough;

a second layer disposed adjacent the first layer and fabricated from a loosely woven material;

a third layer disposed adjacent the second layer and fabricated from a hydrophilic breathable film; and as fourth layer disposed adjacent the third layer the pair of perspiration barriers defining respectively barrier peripheral edge regions, each barrier peripheral edge region being coupled to and at least partially circumvented by a corresponding peripheral edge region collectively defined by the torso portion and a respective one of the sleeve portions such that the external surface of an underarm area of the garment is collectively formed by each of the fourth layers of the perspiration barriers and the respective torso and sleeve portions.]

*16. A garment having an internal surface adapted to contact a wearer's skin and an external surface, the garment, comprising:*

*a torso portion;*

*a pair of sleeve portions attached to and extending from the torso portion in opposed relation to each other; and*

*a pair of perspiration barriers, each of the perspiration barriers comprising:*

*a first layer fabricated from a soft, pliable material adapted to permit the transmission of moisture therethrough;*

*a second layer disposed adjacent the first layer and fabricated from a loosely woven material for channeling moisture therethrough;*

*a third layer disposed adjacent to and bonded to the second layer, and fabricated from a hydrophilic breathable film, the second and third layers together defining a bonded piece; and*

*a fourth layer disposed adjacent the third layer, the pair of perspiration barriers defining respective barrier peripheral edge regions, each barrier peripheral edge region being coupled to and at least partially circumvented by a corresponding peripheral edge region collectively defined by the torso portion and a respective one of the sleeve portions such that the external surface of an underarm area of the garment is collectively formed by each of the fourth layers of the perspiration barriers and the respective torso and sleeve portions;*

*wherein the first layer, the bonded piece, and the fourth layer of each perspiration barrier are joined together solely at the barrier peripheral edge region of each perspiration barrier, such joining solely at the barrier peripheral edge region permitting outside air to be drawn into and between the first layer and the second layer, and into and between the third layer and the fourth layer, thus enhancing evaporative cooling and moisture vapor transmission.*

*17. The garment of claim 16, wherein the third layer is bonded to the second layer via a finely dispersed adhesive dot pattern.*

*18. The garment of claim 17, wherein the joining solely at the barrier peripheral edge region comprises stitching.*

*19. The garment of claim 18, wherein the stitching comprises an overlock stitch covered by a continuous cover stitch.*

*20. A garment having an internal surface adapted to contact a wearer's skin and an external surface, the garment, comprising:*

*a torso portion;*

*a pair of sleeve portions attached to and extending from the torso portion in opposed relation to each other; and*

*a pair of perspiration barriers, each of the perspiration barriers comprising:*

*a first layer fabricated from a soft, pliable material adapted to permit the transmission of moisture therethrough;*

*a second layer disposed adjacent the first layer and fabricated from a loosely woven material for channeling moisture therethrough;*

*a third layer disposed adjacent to and bonded to the second layer, and fabricated from a hydrophilic breathable film, the second and third layers together defining a bonded piece; and*

*a fourth layer disposed adjacent the third layer, the pair of perspiration barriers defining respective barrier peripheral edge regions, each barrier peripheral edge region being coupled to and at least partially circumvented by a corresponding peripheral edge region collectively defined by the torso portion and a respective one of the sleeve portions such that the external surface of an underarm area of the garment is collectively formed by each of the fourth layers of the perspiration barriers and the respective torso and sleeve portions;*

*wherein the first layer, the bonded piece, and the fourth layer of each perspiration barrier are joined together solely at the barrier peripheral edge region, and each define a foldable crease region, such joining solely at the barrier peripheral edge regions permitting outside air to be drawn into and between the first layer and the second layer, and into and between the third layer and the fourth layer, thus enhancing evaporative cooling and moisture vapor transmission, and the foldable crease region further allowing a wearer to lift and lower their arms more easily and with reduced noise and material.*

*21. The garment of claim 20, wherein the third layer is bonded to the second layer via a finely dispersed adhesive dot pattern.*

*22. The garment of claim 20, wherein the joining solely at the barrier peripheral edge region comprises stitching.*

*23. The garment of claim 22, wherein the stitching comprises an overlock stitch covered by a continuous cover stitch.*

* * * * *